United States Patent
Lao (10) Patent No.: US 9,009,245 B2
(45) Date of Patent: Apr. 14, 2015

(54) MESSENGER CLIENT AND METHOD FOR UPDATING MESSAGES IN MESSENGER CLIENT

(71) Applicant: Tencent Technology (Shenzhen) Company Limited, Shenzhen (CN)

(72) Inventor: Ning Lao, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 13/737,320

(22) Filed: Jan. 9, 2013

(65) Prior Publication Data
US 2013/0124660 A1 May 16, 2013

Related U.S. Application Data

(63) Continuation of application No. PCT/CN2011/078746, filed on Aug. 23, 2011.

(30) Foreign Application Priority Data

Aug. 24, 2010 (CN) .......................... 2010 1 0266914

(51) Int. Cl.
*H04L 12/58* (2006.01)
*H04L 12/64* (2006.01)
(Continued)

(52) U.S. Cl.
CPC .................. *H04L 51/00* (2013.01); *H04W 4/12* (2013.01); *H04L 12/58* (2013.01); *H04L 12/6418* (2013.01); *H04L 12/66* (2013.01)

(58) Field of Classification Search
CPC ......... H04L 29/08; H04L 12/58; H04L 12/56; H04L 51/00; G06F 15/16; H04W 4/12

USPC .................................................. 709/206, 227
See application file for complete search history.

(56) References Cited

U.S. PATENT DOCUMENTS 596,663 A * 1/1898 Neuber ............................ 298/7
5,185,604 A * 2/1993 Nepple et al. ................ 340/7.56
(Continued)

FOREIGN PATENT DOCUMENTS

CN 101425093 A 5/2009
CN 101782913 A 7/2010

OTHER PUBLICATIONS

International Preliminary Report on Patentability (Chapter I of the Patent Cooperation Treaty) for PCT/CN/078746 (in Chinese with English Translation) issued Feb. 26, 2013; ISA/CN.
(Continued)

*Primary Examiner* — O. C. Vostal
(74) *Attorney, Agent, or Firm* — Harness, Dickey & Pierce, P.L.C.

(57) ABSTRACT

Updating messages in a messenger client includes a messenger client judging whether it is necessary to pull a new message or a new message notification from a messenger server according to a state of the messenger client; performing an action of pulling a new message notification from the messenger server in response to a determination that it is necessary to pull a new message notification; and performing an action of pulling new messages from the messenger server in response to a determination that it is necessary to pull a new message. The messenger client includes a state judging module and a pulling module. A new message notification is pulled when it is determined it is only necessary to pull a new message notification.

20 Claims, 6 Drawing Sheets

(51) Int. Cl.
*H04L 12/66* (2006.01)
*H04W 4/12* (2009.01)

(56) References Cited

U.S. PATENT DOCUMENTS

| | | | | |
|---|---|---|---|---|
| 5,333,266 A * | 7/1994 | Boaz et al. | | 709/206 |
| 5,675,507 A * | 10/1997 | Bobo, II | | 709/206 |
| 5,708,422 A * | 1/1998 | Blonder et al. | | 340/5.41 |
| 5,802,466 A * | 9/1998 | Gallant et al. | | 455/413 |
| 6,064,877 A * | 5/2000 | Yanagida | | 455/412.1 |
| 6,136,158 A * | 10/2000 | Wang et al. | | 204/177 |
| 6,192,396 B1 * | 2/2001 | Kohler | | 709/206 |
| 6,417,819 B1 * | 7/2002 | Matsumoto et al. | | 345/1.1 |
| 7,127,507 B1 * | 10/2006 | Clark et al. | | 709/224 |
| 7,269,655 B2 * | 9/2007 | Kim | | 709/228 |
| 7,325,042 B1 * | 1/2008 | Soscia et al. | | 709/219 |
| 7,627,658 B2 * | 12/2009 | Levett et al. | | 709/223 |
| 7,640,267 B2 * | 12/2009 | Spivack et al. | | 1/1 |
| 8,060,065 B1 * | 11/2011 | Lai et al. | | 455/413 |
| 8,069,166 B2 * | 11/2011 | Alvarado et al. | | 707/722 |
| 8,407,292 B2 * | 3/2013 | Grosu | | 709/206 |
| 8,429,224 B2 * | 4/2013 | Patel et al. | | 709/203 |
| 8,543,665 B2 * | 9/2013 | Ansari et al. | | 709/218 |
| 2002/0026513 A1 * | 2/2002 | Hoglund et al. | | 709/227 |
| 2002/0087631 A1 * | 7/2002 | Sharma | | 709/203 |
| 2002/0087643 A1 * | 7/2002 | Parsons et al. | | 709/206 |
| 2002/0126708 A1 * | 9/2002 | Skog et al. | | 370/522 |
| 2004/0249958 A1 * | 12/2004 | Ozdemir et al. | | 709/229 |
| 2004/0255254 A1 * | 12/2004 | Weingart et al. | | 715/804 |
| 2005/0038863 A1 * | 2/2005 | Onyon et al. | | 709/207 |
| 2005/0050349 A1 * | 3/2005 | Bobo, II | | 713/200 |
| 2005/0054334 A1 * | 3/2005 | Brown et al. | | 455/414.4 |
| 2005/0091329 A1 * | 4/2005 | Friskel | | 709/206 |
| 2005/0210114 A1 * | 9/2005 | Washburn | | 709/206 |
| 2005/0223061 A1 * | 10/2005 | Auerbach et al. | | 709/206 |
| 2005/0289612 A1 * | 12/2005 | Morton et al. | | 725/76 |
| 2006/0059238 A1 * | 3/2006 | Slater et al. | | 709/206 |
| 2006/0095525 A1 * | 5/2006 | Mousseau et al. | | 709/206 |
| 2007/0038711 A1 * | 2/2007 | MacBeth et al. | | 709/206 |
| 2007/0115936 A1 * | 5/2007 | Newton | | 370/352 |
| 2007/0174393 A1 * | 7/2007 | Bosschaert et al. | | 709/206 |
| 2007/0253340 A1 * | 11/2007 | Varney et al. | | 370/252 |
| 2007/0282959 A1 * | 12/2007 | Stern | | 709/206 |
| 2008/0098014 A1 * | 4/2008 | Eichstaedt et al. | | 707/100 |
| 2008/0098075 A1 * | 4/2008 | O'Bryan et al. | | 709/206 |
| 2008/0120183 A1 | 5/2008 | Park | | |
| 2008/0140665 A1 * | 6/2008 | Ariel et al. | | 707/9 |
| 2008/0172458 A1 * | 7/2008 | Middleton et al. | | 709/203 |
| 2009/0070419 A1 * | 3/2009 | Gilfix et al. | | 709/204 |
| 2009/0198728 A1 * | 8/2009 | Davia et al. | | 707/103 R |
| 2009/0249247 A1 * | 10/2009 | Tseng et al. | | 715/808 |
| 2009/0265643 A1 * | 10/2009 | Jachner et al. | | 715/758 |
| 2009/0305732 A1 * | 12/2009 | Marcellino et al. | | 455/466 |
| 2010/0041380 A1 * | 2/2010 | Hewes et al. | | 455/414.4 |
| 2010/0100845 A1 * | 4/2010 | Khan et al. | | 715/810 |
| 2010/0144380 A1 * | 6/2010 | Washburn | | 455/466 |
| 2010/0208662 A1 * | 8/2010 | Fuste Vilella et al. | | 370/328 |
| 2010/0240417 A1 * | 9/2010 | Wickman et al. | | 455/566 |
| 2010/0250477 A1 * | 9/2010 | Yadav | | 706/14 |
| 2010/0261492 A1 * | 10/2010 | Salafia et al. | | 455/466 |
| 2010/0306536 A1 * | 12/2010 | Brouk et al. | | 713/168 |
| 2011/0047483 A1 * | 2/2011 | Low et al. | | 715/752 |
| 2011/0107379 A1 * | 5/2011 | Lajoie et al. | | 725/87 |
| 2011/0113084 A1 * | 5/2011 | Ramnani | | 709/201 |
| 2011/0119258 A1 * | 5/2011 | Forutanpour et al. | | 707/723 |
| 2011/0145345 A1 * | 6/2011 | Wysham | | 709/206 |
| 2011/0196933 A1 * | 8/2011 | Jackson et al. | | 709/206 |
| 2011/0258280 A1 * | 10/2011 | Sloan et al. | | 709/207 |
| 2011/0276636 A1 * | 11/2011 | Cheng et al. | | 709/206 |
| 2012/0021781 A1 * | 1/2012 | Aaltonen et al. | | 455/466 |
| 2012/0023304 A1 * | 1/2012 | Chan et al. | | 711/170 |
| 2013/0132854 A1 * | 5/2013 | Raleigh et al. | | 715/738 |
| 2013/0143533 A1 * | 6/2013 | Carlson et al. | | 455/412.1 |
| 2013/0179517 A1 * | 7/2013 | Grosu | | 709/206 |
| 2013/0204934 A1 * | 8/2013 | Srivastava et al. | | 709/204 |
| 2013/0346700 A1 * | 12/2013 | Tomlinson et al. | | 711/133 |

OTHER PUBLICATIONS

International Search Report for International Patent Application No. PCT/CN2011/078746, dated Nov. 3, 2011, and English translation thereof.

* cited by examiner

MESSENGER CLIENT AND METHOD FOR UPDATING MESSAGES IN MESSENGER CLIENT

CROSS-REFERENCE TO RELATED APPLICATIONS

This application is a continuation of International Application No. PCT/CN2011/078746, filed on Aug. 23, 2011. This application claims the benefit and priority of Chinese Patent Application No. 201010266914.4, filed Aug. 24, 2010. The entire disclosures of each of the above applications are incorporated herein by reference.

FIELD

The present disclosure relates to computer network communications, and to a messenger client and a method for updating messages in a messenger client.

BACKGROUND

This section provides background information related to the present disclosure which is not necessarily prior art.

The internet has been popular with web users along with developments in network techniques. Among various Internet applications, messenger clients have already been widely used for distributing and sharing information in work and entertainment by most web users. When a messenger client performs communications, there are usually mass amounts of data (e.g. messages) to be updated. A conventional updating manner is implemented by a messenger client pulling updated data from a messenger server.

A twitter-like system, i.e. a micro blog system, is a typical system adopting the above updating manner for message update. A micro blog system is a platform providing information sharing, distributing and accessing based on a pan-relation chain model. Current popular micro blog systems include webpage-based micro-blog systems and client-based micro blog systems.

SUMMARY

This section provides a general summary of the disclosure, and is not a comprehensive disclosure of its full scope or all of its features.

Various embodiments provide a messenger client and a method for updating messages in a messenger client to reduce the pressure on a messenger server for updating messages.

A method for updating messages in a messenger client according to an embodiment may include judging, by a messenger client, whether it is necessary to pull a new message or a new message notification from a messenger server according to a state of the messenger client; performing an action of pulling a new message notification from the messenger server in response to a determination that it is necessary to pull a new message notification; and performing an action of pulling new messages from the messenger server in response to a determination that it is necessary to pull a new message.

The messenger client according to an embodiment may include a state judging module, configured to judge whether it is necessary to pull a new message or a new message notification from a messenger server according to a state of a messenger client; a pulling module, configured to perform an action of pulling new messages from the messenger server when the state judging module determines it is necessary to pull a new message from the messenger server, and to perform an action of pulling a new message notification from the messenger server when the state judging module determines it is necessary to pull a new message notification.

According to the above technical scheme, a messenger client judges whether it is necessary to pull a new message or a new message notification according to a state of the messenger client. When it is only necessary to pull a new message notification, the messenger client pulls a new message notification only. In this way, the user can be informed of new messages, and at the same time the pressure on the messenger server for updating messages is also reduced.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
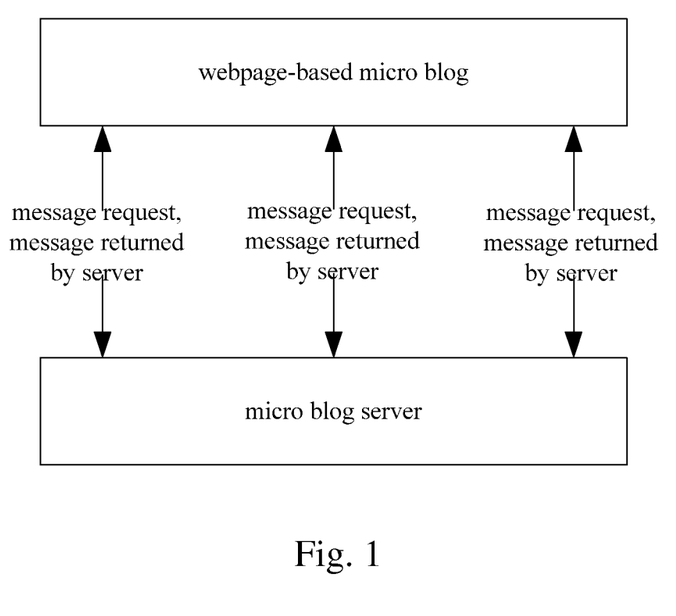
FIG. 1 is a schematic diagram illustrating a conventional method of updating messages in a webpage-based micro blog system.

In a webpage-based micro blog system, a micro blog server will not send notifications of new messages to users. Message update is realized by a user manually refreshing a webpage providing micro blog service to send a request to a micro blog server for obtaining new messages. The detailed process is as shown in FIG. 1. FIG. 1 is a schematic diagram illustrating a conventional method of updating messages in a webpage-based micro blog system. As shown in FIG. 1, when a user refreshes a micro blog webpage, the micro blog webpage sends a request for updating messages to a micro blog server. After receiving the request, the micro blog server returns a new message to the micro blog webpage. In the above message updating manner, if the user refreshes the micro blog webpage too frequently requesting message update, workload of the micro blog service will increase remarkably.

Figure 2:
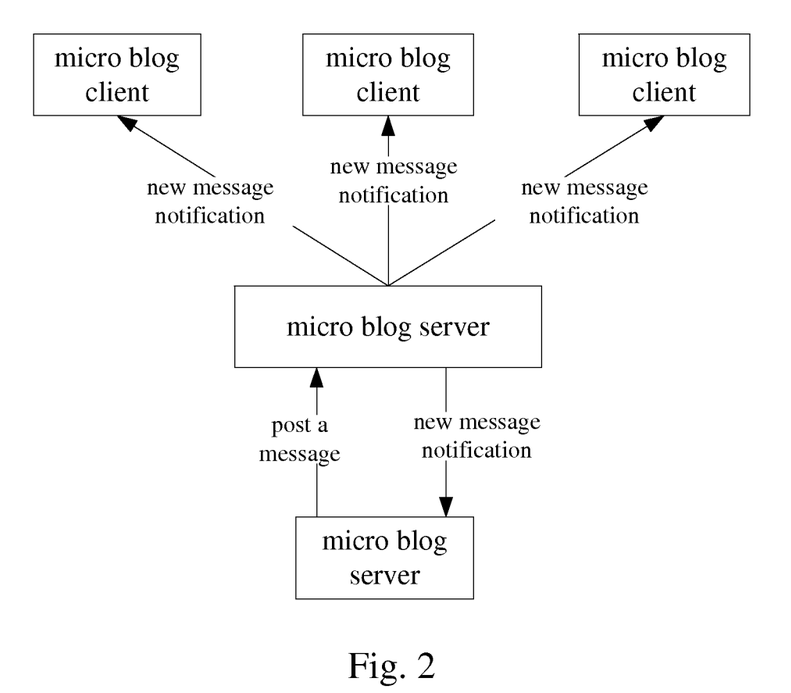
FIG. 2 is a schematic diagram illustrating a structure of a conventional client-based micro blog system.

In contrast to the webpage-based micro blog system, in a client-based micro blog system, a micro blog server may inform a micro blog client of a new message upon receiving the new message. FIG. 2 is a schematic diagram illustrating a structure of a conventional client-based micro blog system. As shown in FIG. 2, when a micro blog user posts a new message, each of N micro blog users who are followers of the micro blog user will receive a notification for the new message. Therefore, in the client-based micro blog system, message distribution no longer adopts the conventional one-to-one manner as in conventional IM (Instant Messaging) applications, but is in a one-to-N manner. This means message notifications frequently sent in a client-based micro blog system. After receiving the notification, the N micro blog clients may initiate a message updating procedure at once. This leads to added burden of the micro blog server for performing a large amount of message updates.

It can be seen that the conventional message updating method adopted by messenger clients puts great pressure on the messenger server for updating mass amounts of messages.

A messenger client may judge whether it is necessary to pull a new message or a new message notification according to a state of the messenger client. The messenger client may pull the new message notification only in response to a determination that it is necessary only to pull a new message notification. In this way, the user can be informed of the new message, and at the same time the pressure on the messenger server for updating messages is also reduced.

Figure 3:
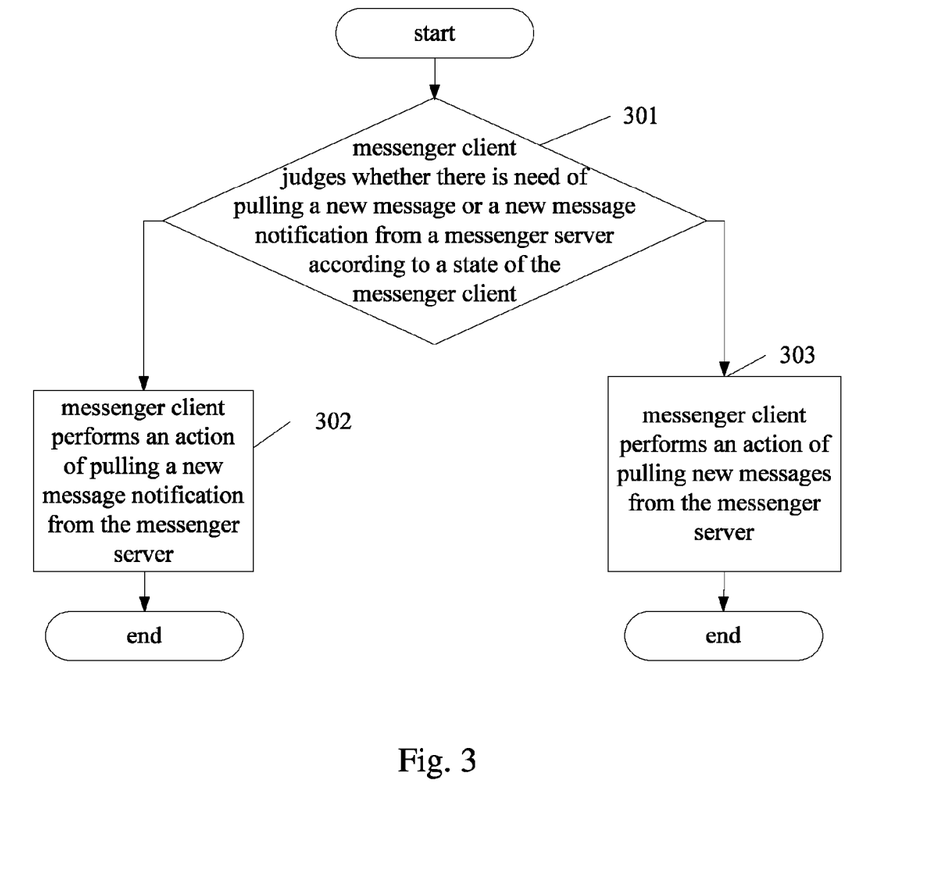
FIG. 3 is a flowchart illustrating a method for updating messages in a messenger client in accordance with an embodiment.

FIG. 3 is a flowchart illustrating a method for updating messages in a messenger client. As shown in FIG. 3, the method may include the following procedures.

In block 301, a messenger client judges whether it is necessary to pull a new message or a new message notification from a messenger server according to a state of the messenger client. The messenger client performs the procedure in block 302 in response to a determination that it is necessary to pull a new message, and performs the procedure in block 303 in response to a determination that it is necessary to pull a new message notification.

In block 302, the messenger client performs an action of pulling new messages from the messenger server, and ends the process.

In block 303, the messenger client performs an action of pulling a new message notification from the messenger server.

The state of the messenger client at a time spot reflects the current need of the user. In block 301, the messenger client may judge whether it is necessary to pull a new message or a new message notification from the messenger server based on the state of the messenger client.

The above messenger client may be a micro blog client. The method for updating messages will be described in more detail as follows by using a micro blog client as an example. Table 1 illustrates a relation between a state of a micro blog client and the need of a micro blog user.

TABLE 1

| state of micro blog client | need of micro blog user |
|---|---|
| the micro blog client is invisible | no interest in new message notification and new messages from the micro blog service |
| the micro blog client is visible but the micro blog interface is invisible | interest in new messages from the micro blog service, but no interest in contents of the messages |
| both the micro blog client and the micro blog interface are visible | interest in both new messages and contents of the messages from the micro blog service |

It can be seen from the relation shown in Table 1, when the state of a micro blog client indicates that the micro blog client is invisible, it means the micro blog user at that moment is not interested in new message notifications or new messages from the micro blog, and therefore the micro blog client does not need to perform the action of pulling new messages or new message notifications. When the state of the micro blog client indicates that the micro blog client is visible but the micro blog interface is invisible, it means the micro blog user is interested in whether there is a new message from the micro blog but has no interest in contents of the message, and therefore, the micro blog client only needs to perform the action of pulling a new message notification from the micro blog server. When the state of the micro blog client indicates that both the micro blog client and the micro blog interface are visible, it means the micro blog user is not only interested in whether there is a new message from the micro blog but also interested in the contents of the message, and therefore, the micro blog client needs to perform the action of pulling new messages from the micro blog server.

The above description uses the relation between the state of a micro blog client and the needs of a user as an example. It should be noted that the messenger client is not limited to the micro blog client.

In the various embodiments, the size of a message notification is relatively small, and the size of a message is relatively large. Thus, when the user is not interested in message contents, message notifications are used to not only reduce resource consumption but also reduce the pressure on the messenger server. New messages are pulled only when the user is interested in contents of new messages, i.e. when the user is browsing or operating on a messenger interface. In this way, the user can be informed of the new message, and at the same time the pressure on the messenger server for updating messages is also reduced.

Figure 4:
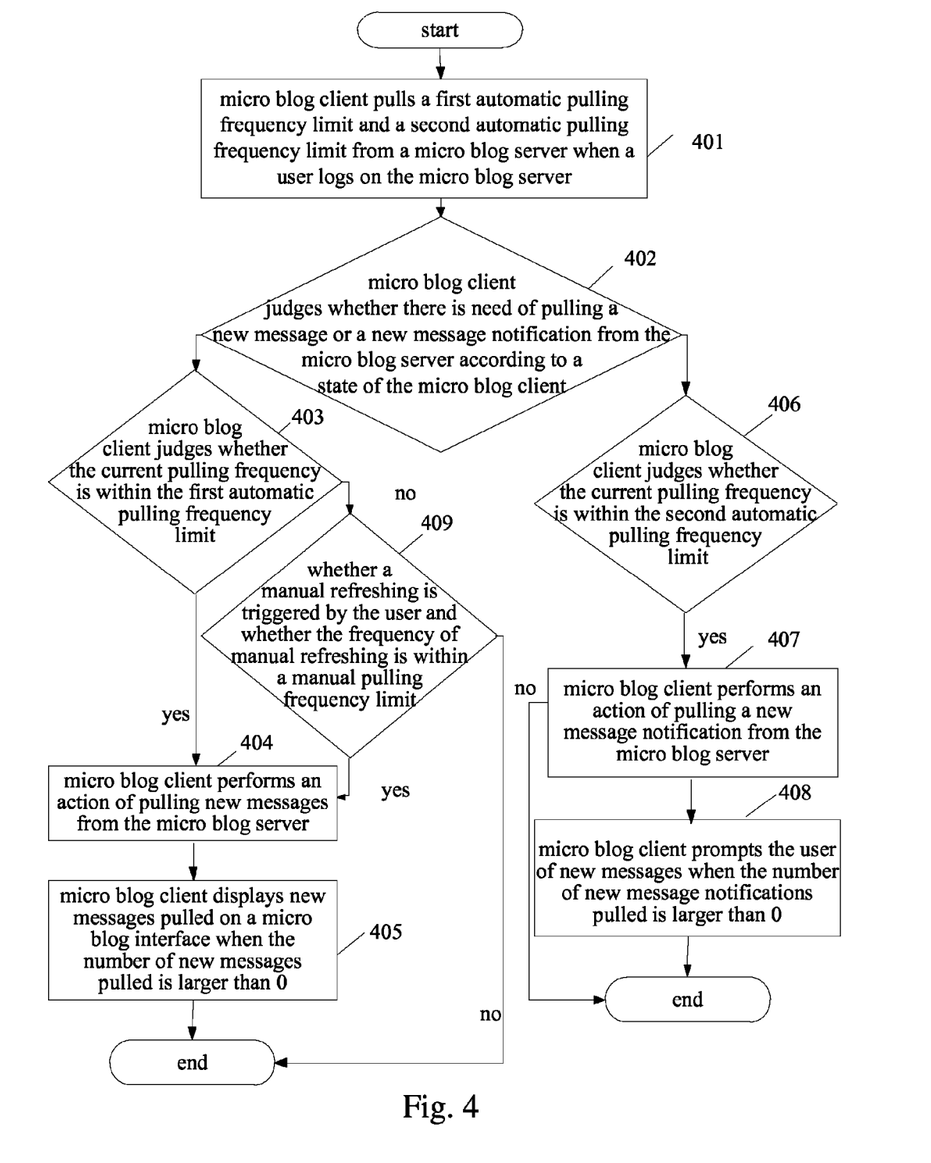
FIG. 4 is a flowchart illustrating a method for updating messages in a micro blog client in accordance with an embodiment.

In addition, according to various embodiments, the messenger server may set a pulling frequency to control the action of pulling new messages or new message notification of the messenger client so as to further control the message update pressure on the messenger server. The following description still uses a micro blog client as an example. FIG. 4 is a flowchart illustrating a method for updating messages in a micro blog client in accordance with various embodiments. As shown in FIG. 4, the method may include the following procedures.

In block 401, when a micro blog user logs on a micro blog client, the micro blog client pulls a first automatic pulling frequency limit and a second automatic pulling frequency limit from a micro blog server. The first automatic pulling frequency limit and the second automatic pulling frequency limit are set by the micro blog server for limiting the frequency of pulling new messages and new message notifications by the micro blog client from the micro blog server respectively.

In block 402, the micro blog client judges whether it is necessary to pull a new message or a new message notification from the micro blog server according to a state of the micro blog client. The micro blog client performs the procedure in block 403 in response to a determination that it is necessary to pull a new message, and performs the procedure in block 406 in response to a determination that it is necessary to pull a new message notification.

In block 403, the micro blog client judges whether a current pulling frequency is within the first automatic pulling frequency limit, performs the procedure in block 404 in response to a determination that the current pulling frequency is within the first automatic pulling frequency limit, and ends the current process in response to a determination that the current pulling frequency is beyond the first automatic pulling frequency limit.

In block 404, the micro blog client performs an action of pulling new messages from the micro blog server.

In block 405, the micro blog client displays the new message on a micro blog interface in response to a determination that the number of new messages pulled is larger than 0, and terminates the process.

In block 406, the micro blog client judges whether a current pulling frequency is within the second automatic pulling frequency limit, performs the procedure in block 407 in response to a determination that the current pulling frequency is within the second automatic pulling frequency limit, and terminates the current process in response to a determination that the current pulling frequency is beyond the second automatic pulling frequency limit.

In block 407, the micro blog client performs an action of pulling a new message notification from the micro blog server.

In block 408, the micro blog client prompts the user that there is a new message in response to a determination that the number of new message notifications pulled from the micro blog server is larger than 0. The micro blog client may lighten a tag on the micro blog interface to inform the user that there is a new message. The new message notification may include a total number of new messages. The total number of new messages may be displayed on a tag on the micro blog interface.

In various embodiments the micro blog server may configure a manual pulling frequency limit besides the first and the second automatic pulling frequency limits. According to the embodiment, the micro blog client may pull the manual pulling frequency limit from the micro blog server when pulling the first and the second automatic pulling frequency limits in block 401.

The micro blog client may further perform the procedure in block 409 in response to a determination made in block 403 that the current pulling frequency is beyond the first automatic pulling frequency limit.

In block 409, the micro blog client judges whether a manual refreshing operation is initiated by the user, and performs the procedure in block 407, i.e. pulling the new message from the micro blog server, in response to a determination that a manual refreshing operation is triggered by the user and the frequency of manual refreshing is within the manual pulling frequency limit; otherwise terminates the process.

According to various embodiments, the frequency of pulling operations performed by the micro blog client can be controlled by the micro blog server by setting automatic pulling frequency limits and a manual pulling frequency limit. Therefore, pressure on the messenger server resulting from large amounts of message updates can be avoided.

In addition, the messenger client may pull a first update frequency when pulling the first automatic pulling frequency limit from the messenger server, pull a new first automatic pulling frequency limit from the messenger server at a frequency defined by the first update frequency, and update the current first automatic pulling frequency limit with the new first automatic pulling frequency limit.

Similarly, the messenger client may pull a second update frequency when pulling the second automatic pulling frequency limit from the messenger server, pull a new second automatic pulling frequency limit from the messenger server at a frequency defined by the second update frequency, and update the current second automatic pulling frequency limit with the new second automatic pulling frequency limit.

Figure 5:
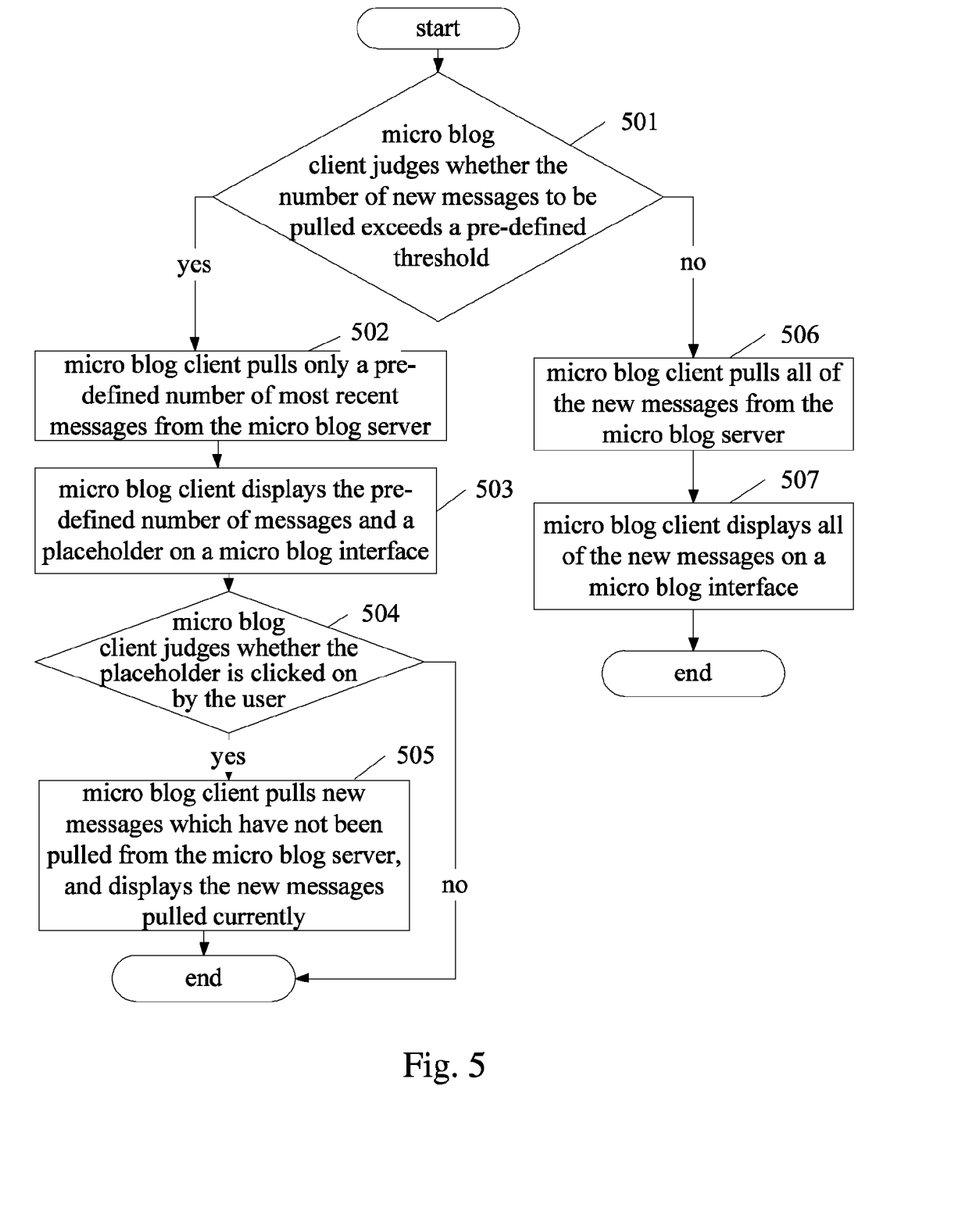
FIG. 5 is a flowchart illustrating a method for pulling messages by a micro blog client from a micro blog server in accordance with an embodiment.

Further, according to various embodiments, the messenger client may judge whether there are a large amount of new messages to be pulled before the procedure in block 302 or 404, i.e. before performing the action of pulling the new message from the messenger server, and pull the most recent one or more messages from the messenger server leaving the rest of the new messages to be pulled later when the user needs those new messages in response to a determination that there are a large amount of new messages to be pulled. In this way, the pressure on the messenger server can be further reduced. The following description still uses a micro blog client as an example. FIG. 5 is a flowchart illustrating a method for pulling messages by a micro blog client from a micro blog server in accordance with various embodiments. As shown in FIG. 5, the method may include the following.

In block 501, a micro blog client judges whether the number of new messages to be pulled exceeds a pre-defined threshold, performs the procedure in block 502 in response to a determination that the number of new messages to be pulled exceeds a pre-defined threshold, and performs the procedure in block 506 in response to a determination that the number of new messages to be pulled does not exceed the pre-defined threshold.

In block 502, the micro blog client pulls a pre-defined number of most recent messages from a micro blog server, where the pre-defined number is smaller than the pre-defined threshold. Thereby, when there are a large number of new messages, only the most recent ones are to be pulled.

In block 503, the micro blog client displays the pre-defined number of most recent messages on a micro blog interface, and displays a placeholder on the micro blog interface representing the new messages not pulled. For example, the placeholder may be a character string indicating "display more information".

In block 504, the micro blog client judges whether the user has clicked on the placeholder, performs the procedure in block 505 in response to a determination that the user has clicked on the placeholder, or terminates the process in response to a determination that the user has not clicked on the placeholder.

In block 505, the micro blog client pulls the new messages which have not been pulled from the micro blog server, displays the new messages currently pulled on the micro blog interface, and terminates the process.

In block 506, the micro blog client pulls all of the new messages from the micro blog server.

In block 507, the micro blog client displays all of the new messages on the micro blog interface.

The above description described the method for updating messages in a messenger client in detail. The messenger client of an embodiment will be described further in below.

Figure 6:
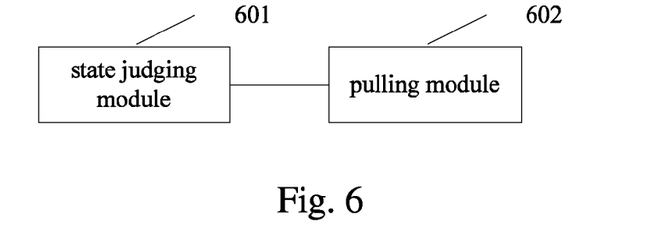
FIG. 6 is a schematic diagram illustrating a structure of a messenger client in accordance with an embodiment.

FIG. 6 is a schematic diagram illustrating a structure of a messenger client in accordance with various embodiments. As shown in FIG. 6, the messenger client may include:

a state judging module 601, configured to judge whether it is necessary to pull a new message or a new message notification from a messenger server according to a state of the messenger client;

a pulling module 602, configured to perform an action of pulling new messages from the messenger server when the state judging module 601 determines it is necessary to pull a new message from the messenger server, and to perform an action of pulling a new message notification from the messenger server when the state judging module 601 determines it is necessary to pull a new message notification.

The messenger client will be described in more detail as follows using a micro blog client as an example.

Figure 7:
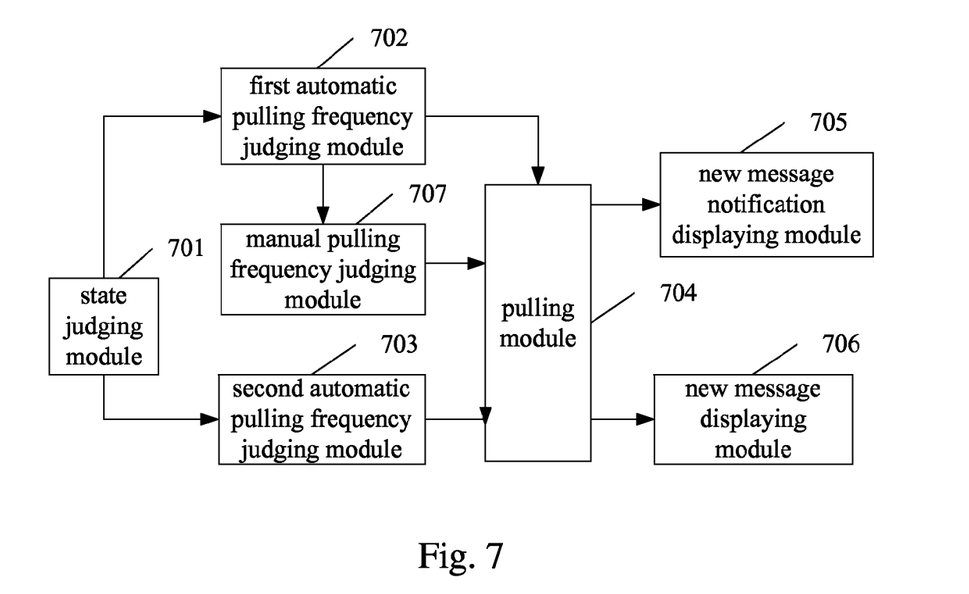
FIG. 7 is a schematic diagram illustrating a structure of a messenger client in accordance with an embodiment.

FIG. 7 is a schematic diagram illustrating a structure of a messenger client in accordance with various embodiments. As shown in FIG. 7, the micro blog client may include: a state judging module 701, a first automatic pulling frequency judging module 702, a second automatic pulling frequency judging module 703, a pulling module 704, a new message notification displaying module 705, and a new message displaying module 706.

The state judging module 701 is configured to judge whether it is necessary to pull a new message or a new message notification from a messenger server according to a state of the micro blog client.

The state judging module 701 determines it is not necessary to pull a new message or a new message notification in response to a determination that the state of the micro blog client indicates that the micro blog client is invisible.

The state judging module 701 determines to perform an action of pulling a new message notification from the micro blog server in response to a determination that the state of the micro blog client indicates the micro blog client is visible but the micro blog interface is invisible.

The state judging module 701 determines to perform an action of pulling new messages from the micro blog server in response to a determination that the state of the micro blog client indicates both the micro blog client and the micro blog interface are visible.

The first automatic pulling frequency judging module 702 is configured to judge whether the current pulling frequency is within a first automatic pulling frequency limit set by the micro blog server when the state judging module 701 determines it is necessary to pull a new message.

The second automatic pulling frequency judging module 703 is configured to judge whether the current pulling frequency is within a second automatic pulling frequency limit set by the micro blog server when the state judging module 701 determines it is necessary to pull a new message notification.

The pulling module 704 is configured to perform an action of pulling new messages from the micro blog server when the first automatic pulling frequency judging module determines the current pulling frequency is within the first automatic pulling frequency limit set by the micro blog server, and perform an action of pulling a new message notification from the micro blog server when the second automatic pulling frequency judging module 703 determines the current pulling frequency is within the second automatic pulling frequency limit set by the micro blog server.

The new message notification displaying module 705 is configured to lighten a tag on the micro blog interface to prompt the user that there is a new message if the number of new message notification pulled is larger than 0 after the pulling module 704 has pulled the new message notification from the micro blog server.

The new message displaying module 706 is configured to display new messages pulled on the micro blog interface if the number of the new messages pulled is larger than 0 after the pulling module 704 has pulled the new messages from the micro blog server.

The new message notification may be a total number of new messages. The new message notification module may further display the total number of new messages on a tag on the micro blog interface to inform the user of the new messages.

The first automatic pulling frequency judging module 702 may further be configured to pull a first automatic pulling frequency limit from the micro blog server when the user logs on the micro blog client.

The second automatic pulling frequency judging module 703 may further be configured to pull a second automatic pulling frequency limit from the micro blog server when the user logs on the micro blog client.

The first automatic pulling frequency judging module 702 may further be configured to pull a first update frequency when puling the first automatic pulling frequency limit, pull a new first automatic pulling frequency limit from the micro blog server at a frequency specified by the first update frequency, and update the current first automatic pulling frequency limit by using the new first automatic pulling frequency limit.

The second automatic pulling frequency judging module 703 may further be configured to pull a second update frequency when pulling the second automatic pulling frequency limit, pull a new second automatic pulling frequency limit from the micro blog server at a frequency specified by the second update frequency, and update the current second automatic pulling frequency limit by using the new second automatic pulling frequency limit.

The micro blog client of an embodiment may further include a manual pulling frequency judging module 707 which is configured to judge whether a manual refreshing process is triggered by the user when the first automatic pulling frequency judging module 702 determines the current pulling frequency is beyond the first automatic pulling frequency limit, and instruct the pulling module 704 to perform the action of pulling new messages from the micro blog server in response to a determination that a manual refreshing process is triggered by the user and the frequency of the manual refreshing process is within the manual pulling frequency limit.

In various embodiments, the pulling module 704 may judge whether the number of new messages to be pulled exceeds a pre-defined threshold before performing the action of pulling new messages from the micro blog server, pull a pre-defined number of most recent messages from the micro blog server in response to a determination that the number of new messages to be pulled exceeds a pre-defined threshold, and pull all of the new messages from the micro blog server in response to a determination that the number of new messages to be pulled does not exceed a pre-defined threshold. The pre-defined number is smaller than the pre-defined threshold.

The new message displaying module 706 may further be configured to display the pre-defined number of most recent messages on the micro blog interface when the pulling module 704 pulls only the pre-defined number of most recent messages from the micro blog server, and display a placeholder on the micro blog interface representing the new messages not pulled.

After a click by the user on the placeholder on the micro blog interface, the pulling module 704 pulls the new messages which have not been pulled from the micro blog server. The new message displaying module 706 is configured to display the new messages currently pulled on the micro blog interface.

It can be seen that when the messenger client provided by various embodiments is adopted, resources consumed and the pressure on the messenger server can both be reduced by using message notification when the user is not interested in contents of new messages. New messages are pulled only when the user is interested in contents of the new messages, i.e., when the user is browsing or operating on a messenger interface. In this way, the user can be informed of new messages, and at the same time the pressure on the messenger server for updating messages is also reduced. In addition, the frequency of pulling operations performed by the micro blog client can be controlled by the micro blog server by setting automatic pulling frequency limits and a manual pulling frequency limit. Therefore, pressure on the messenger server resulted from large amounts of message updates can be further reduced. When there are numerous new messages to be pulled, the messenger client may pull only some of the most recent messages from the messenger server, and the remaining messages may be pulled when the user has the need, and thereby the pressure on the messenger server for message updates can be further reduced.

The foregoing description of the various embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for updating messages in a messenger client, comprising:
   judging, by a messenger client, whether the messenger client is to pull a new message or a new message notification from a messenger server according to a state of the messenger client;
   deciding, by the messenger client, not to pull a new message notification or a new message in response to a determination that the state of the messenger client indicates a first user interface of the messenger client is invisible;
   pulling, by the messenger client, a new message notification which indicates a total number of new messages from the messenger server in response to a determination that the state of the messenger client indicates the first user interface is visible but a second user interface for displaying messages is invisible; and
   pulling, by the messenger client, the new messages from the messenger server in response to a determination that the state of the messenger client indicates both the first user interface and the second user interface are visible; and
   prompting, by the messenger client, a user that there is a new message when the total number in the new message notification pulled is larger than 0 after pulling the new message notification from the messenger server.

2. The method of claim 1, wherein the prompting by the messenger client the user that there is a new message comprises:
   lightening, by the messenger client, a tag on a messenger interface, and displaying the total number of new messages on a tag on the messenger interface.

3. The method of claim 1, further comprising:
   judging whether a current pulling frequency is within a first automatic pulling frequency limit set by the messenger server before pulling the new messages, pulling, by the messenger client, the new messages from the messenger server in response to a determination that the current pulling frequency is within a first automatic pulling frequency limit; or
   judging whether a current pulling frequency is within a second automatic pulling frequency limit set by the messenger server before pulling a new message notification, pulling, by the messenger client, the new message notification from the messenger server in response to a determination that the current pulling frequency is within a second automatic pulling frequency limit.

4. The method of claim 3, wherein the first automatic pulling frequency limit and the second automatic pulling frequency limit is pulled by the messenger client from the messenger server when the user logs on the messenger client.

5. The method of claim 3, further comprising: setting, by the messenger server, a manual pulling frequency limit;
   judging, by the messenger client, whether a manual refreshing process is triggered by the user after judging the current pulling frequency is beyond the first automatic pulling frequency limit;
   pulling, by the messenger client, the new messages from the messenger server in response to a determination that a manual refreshing process is triggered by the user and a frequency of manual refreshing is within the manual pulling frequency limit.

6. The method of claim 1, further comprising: judging, by the messenger client, whether the number of the new messages to be pulled exceeds a pre-defined threshold before pulling the new messages from the messenger server; pulling, by the messenger client, a pre-defined number of most recent messages from the messenger server in response to a determination that the number of new messages to be pulled exceeds the pre-defined threshold; and pulling, by the messenger client, all of the new messages from the messenger server in response to a determination that the number of new messages to be pulled does not exceed the pre-defined threshold.

7. The method of claim 6, further comprising:
   displaying, by the messenger client, the pre-defined number of most recent messages on the messenger interface when only the pre-defined number of most recent messages are pulled from the messenger server, and displaying a placeholder on the messenger interface representing new messages which have not been pulled;
   displaying, by the messenger client, all of the new messages on the messenger interface when all of the new messages are pulled from the messenger server.

8. The method of claim 7, further comprising: pulling, by the messenger client, the new messages which have not been pulled from the messenger server after a click by the user on the placeholder on the messenger interface, and displaying the new messages currently pulled on the messenger interface.

9. A method for updating messages in a messenger client, comprising:

judging, by a messenger client, whether the messenger client is to pull a new message or a new message notification from a messenger server according to a state of the messenger client;

deciding, by the messenger client, not to pull a new message notification or a new message in response to a determination that the state of the messenger client indicates a first user interface of the messenger client is invisible;

pulling, by the messenger client, a new message notification which indicates a total number of new messages from the messenger server in response to a determination that the state of the messenger client indicates the first user interface is visible but a second user interface for displaying messages is invisible; and pulling, by the messenger client, the new messages from the messenger server in response to a determination that the state of the messenger client indicates both the first user interface and the second user interface are visible; and displaying, by the messenger client, the new messages on a messenger interface when the number of the new messages is larger than 0 after pulling the new messages from the messenger server.

10. A method for updating messages in a messenger client, comprising:

judging, by a messenger client, whether the messenger client is to pull a new message or a new message notification from a messenger server according to a state of the messenger client;

deciding, by the messenger client, not to pull a new message notification or a new message in response to a determination that the state of the messenger client indicates a first user interface of the messenger client is invisible;

pulling, by the messenger client, a new message notification which indicates a total number of new messages from the messenger server in response to a determination that the state of the messenger client indicates the first user interface is visible but a second user interface for displaying messages is invisible; and pulling, by the messenger client, the new messages from the messenger server in response to a determination that the state of the messenger client indicates both the first user interface and the second user interface are visible;

wherein the first user interface of the messenger client is a home interface of the messenger client, the second user interface is a user interface displaying messages.

11. A method for updating messages in a messenger client, comprising:

judging, by a messenger client, whether the messenger client is to pull a new message or a new message notification from a messenger server according to a state of the messenger client;

performing, by the messenger client, an action of pulling a new message notification from the messenger server in response to a determination that the messenger client is to pull a new message notification; and performing, by the messenger client, an action of pulling new messages from the messenger server in response to a determination that the messenger client is to pull a new message;

wherein the new message notification includes a total number of new messages; and the method further comprises: prompting, by the messenger client, a user that there is a new message when the total number in the new message notification pulled is larger than 0 after pulling the new message notification from the messenger server;

judging whether a current pulling frequency is within a first automatic pulling frequency limit set by the messenger server after determining the messenger client is to pull a new message, performing, by the messenger client, the action of pulling new messages from the messenger server in response to a determination that the current pulling frequency is within a first automatic pulling frequency limit; or judging whether a current pulling frequency is within a second automatic pulling frequency limit set by the messenger server after determining the messenger client is to pull a new message notification, performing, by the messenger client, the action of pulling the new message notification from the messenger server in response to a determination that the current pulling frequency is within a second automatic pulling frequency limit;

wherein the first automatic pulling frequency limit and the second automatic pulling frequency limit is pulled by the messenger client from the messenger server when the user logs on the messenger client; and pulling, by the messenger client, a first update frequency and a second update frequency when pulling the first automatic pulling frequency limit and the second automatic pulling frequency limit; pulling a new first automatic pulling frequency limit from the messenger server at a frequency specified by the first update frequency and updating a current first automatic pulling frequency limit by using the new first automatic pulling frequency limit; pulling a new second automatic pulling frequency limit from the messenger server at a frequency specified by the second update frequency and updating a current second automatic pulling frequency limit by using the new second automatic pulling frequency limit.

12. A messenger client, comprising:

a state judging module, configured to judge using a processor whether the messenger client is to pull a new message or a new message notification from a messenger server according to a state of a messenger client;

a pulling module, configured to decide using a processor not to pull a new message notification or a new message in response to a determination of the state judging module that the state of the messenger client indicates a first user interface of the messenger client is invisible, to pull a new message notification which indicates a total number of new messages from the messenger server in response to a determination of the state judging module that the state of the messenger client indicates the first user interface is visible but a second user interface for displaying messages is invisible, and to pull the new messages from the messenger server in response to a determination of the state judging module that the state of the messenger client indicates both the first user interface and the second user interface are visible;

wherein the messenger client further comprises:

a new message notification displaying module, configured to lighten a tag on the micro blog interface using a processor if the total number of new messages in the new message notification pulled is larger than 0 after the pulling module pulled the new message notification from the micro blog server; and a new message displaying module, configured to display using a processor the new messages pulled on the micro blog interface if the number of the new messages pulled is larger than 0 after the pulling module pulled the new messages from the micro blog server.

13. The messenger client of claim 12, wherein
the pulling module is further configured to judge using a processor whether the number of new messages to be pulled exceeds a pre-defined threshold before pulling the new messages from the micro blog server, pull a pre-defined number of most recent messages from the micro blog server in response to a determination that the number of new messages to be pulled exceeds a pre-defined threshold, and pull all of the new messages from the micro blog server in response to a determination that the number of new messages to be pulled does not exceed a pre-defined threshold; wherein the pre-defined number is smaller than the pre-defined threshold.

14. The messenger client of claim 13, wherein
the new message displaying module is further configured to display using a processor the pre-defined number of most recent messages on the micro blog interface when the pulling module pulls only the pre-defined number of most recent messages from the micro blog server, and display a placeholder on the micro blog interface representing the new messages not pulled.

15. The messenger client of claim 14, wherein
the pulling module is further configured to pull using a processor new messages which have not been pulled after a click by a user on the placeholder on the messenger interface;
the new message displaying module is further configured to display using a processor the new messages pulled currently on the messenger interface.

16. The messenger client of claim 12, further comprising:
a first automatic pulling frequency judging module and a second automatic pulling frequency judging module; wherein
the first automatic pulling frequency judging module is configured to judge using a processor whether the current pulling frequency is within a first automatic pulling frequency limit before the pulling module pulls the new messages; and
the second automatic pulling frequency judging module is configured to judge using a processor whether the current pulling frequency is within a second automatic pulling frequency limit before the pulling module pulls the new message notification.

17. The messenger client of claim 16, further comprising:
a manual pulling frequency judging module, configured to judge using a processor whether a manual refreshing process is triggered by a user when the first automatic pulling frequency judging module determines the current pulling frequency is beyond the first automatic pulling frequency limit, and instruct the pulling module to pull the new messages from the micro blog server in response to a determination that a manual refreshing process is triggered by a user and the frequency of the manual refreshing process is within the manual pulling frequency limit.

18. A messenger client, comprising:
a state judging module, configured to judge using a processor whether the messenger client is to pull a new message or a new message notification from a messenger server according to a state of a messenger client;
a pulling module, configured to decide using a processor not to pull a new message notification or a new message in response to a determination of the state judging module that the state of the messenger client indicates a first user interface of the messenger client is invisible, to pull a new message notification which indicates a total number of new messages from the messenger server in response to a determination of the state judging module that the state of the messenger client indicates the first user interface is visible but a second user interface for displaying messages is invisible, and to pull the new messages from the messenger server in response to a determination of the state judging module that the state of the messenger client indicates both the first user interface and the second user interface are visible;
wherein first user interface of the messenger client is a home interface of the messenger client, the second user interface is a user interface displaying messages.

19. A messenger client, comprising:
a state judging module, configured to judge using a processor whether the messenger client is to pull a new message or a new message notification from a messenger server according to a state of a messenger client;
a pulling module, configured to perform an action of pulling new messages from the messenger server using a processor when the state judging module determines the messenger client is to pull a new message from the messenger server, and to perform an action of pulling a new message notification from the messenger server using a processor when the state judging module determines the messenger client is to pull a new message notification;
wherein the new message notification includes a total number of new messages, and the messenger client further comprises:
a new message notification displaying module, configured to lighten a tag on the micro blog interface using a processor if the total number of new messages in the new message notification pulled is larger than 0 after the pulling module performed the action of pulling the new message notification from the micro blog server; and
a new message displaying module, configured to display using a processor the new messages pulled on the micro blog interface if the number of the new messages pulled is larger than 0 after the pulling module performed the action of pulling the new messages from the micro blog server;
wherein the messenger client further comprising: a first automatic pulling frequency judging module and a second automatic pulling frequency judging module; wherein
the first automatic pulling frequency judging module is configured to judge using a processor whether the current pulling frequency is within a first automatic pulling frequency limit when the state judging module determines the messenger client is to pull a new message; and
the second automatic pulling frequency judging module is configured to judge using a processor whether the current pulling frequency is within a second automatic pulling frequency limit when the state judging module determines the messenger client is to pull a new message notification;
wherein the first automatic pulling frequency judging module is further configured to pull the first automatic pulling frequency limit from the messenger server using a processor when a user logs on the micro blog client; and
the second automatic pulling frequency judging module is further configured to pull the second automatic pulling frequency limit from the messenger server using a processor when a user logs on the micro blog client.

20. A messenger client, comprising:
a state judging module, configured to judge using a processor whether the messenger client is to pull a new message or a new message notification from a messenger server according to a state of a messenger client;
a pulling module, configured to perform an action of pulling new messages from the messenger server using a processor when the state judging module determines the messenger client is to pull a new message from the messenger server, and to perform an action of pulling a new message notification from the messenger server using a processor when the state judging module determines the messenger client is to pull a new message notification;
wherein the new message notification includes a total number of new messages, and the messenger client further comprises:
a new message notification displaying module, configured to lighten a tag on the micro blog interface using a processor if the total number of new messages in the new message notification pulled is larger than 0 after the pulling module performed the action of pulling the new message notification from the micro blog server; and
a new message displaying module, configured to display the new messages pulled on the micro blog interface using a processor if the number of the new messages pulled is larger than 0 after the pulling module performed the action of pulling the new messages from the micro blog server;
wherein the messenger client further comprising: a first automatic pulling frequency judging module and a second automatic pulling frequency judging module; wherein the first automatic pulling frequency judging module is configured to judge using a processor whether the current pulling frequency is within a first automatic pulling frequency limit when the state judging module determines the messenger client is to pull a new message; and
the second automatic pulling frequency judging module is configured to judge using a processor whether the current pulling frequency is within a second automatic pulling frequency limit when the state judging module determines the messenger client is to pull a new message notification;
wherein the first automatic pulling frequency judging module is further configured to pull a first update frequency using a processor when puling the first automatic pulling frequency limit, pull a new first automatic pulling frequency limit from the messenger server at a frequency specified by the first update frequency, and update a current first automatic pulling frequency limit by using the new first automatic pulling frequency limit; and
the second automatic pulling frequency judging module is further configured to pull a second update frequency using a processor when puling the second automatic pulling frequency limit, pull a new second automatic pulling frequency limit from the messenger server at a frequency specified by the second update frequency, and update a current second automatic pulling frequency limit by using the new second automatic pulling frequency limit.

* * * * *